United States Patent [19]  [11] 4,091,072
McArthur  [45] May 23, 1978

[54] EXHAUST GAS CONVERSION PROCESS AND CATALYST

[75] Inventor: Dennis P. McArthur, Yorba Linda, Calif.

[73] Assignee: Union Oil Company of California, Los Angeles, Calif.

[21] Appl. No.: 774,595

[22] Filed: Mar. 7, 1977

Related U.S. Application Data

[63] Continuation-in-part of Ser. No. 706,684, Jun. 19, 1976.

[51] Int. Cl.² ............................................. B01D 53/34
[52] U.S. Cl. ............................. 423/213.5; 23/288 F; 252/432; 252/460; 252/466 B; 252/472; 252/477 R
[58] Field of Search ............... 423/213.2, 213.5, 213.7; 252/477, 432, 460, 466 B, 472; 23/288 F

[56] References Cited

U.S. PATENT DOCUMENTS

| 3,370,914 | 2/1968 | Gross et al. | 423/213.5 |
| 3,886,260 | 5/1975 | Unland | 423/213.5 |
| 3,910,770 | 10/1975 | Kobylinski et al. | 423/213.7 |
| 3,929,965 | 12/1975 | Kim et al. | 423/213.5 |
| 3,960,510 | 6/1976 | Sergeys | 252/477 R |

Primary Examiner—G. O. Peters
Attorney, Agent, or Firm—Lannas S. Henderson; Richard C. Hartman; Dean Sandford

[57] ABSTRACT

A multi-catalyst system is provided which is effective for the conversion of nitrogen oxides, carbon monoxide and hydrocarbons in near stoichiometric engine exhaust gases in a single conversion zone to which no additional air is admitted. The system comprises at least two separate but contiguous components. The first component comprises a porous inert support having dispersed thereon rhodium plus nickel and/or cobalt, and is essentially free of platinum and palladium. The second component comprises a porous inert support having dispersed thereon platinum and/or palladium, with or without nickel and/or cobalt, and is essentially free of rhodium.

14 Claims, No Drawings

EXHAUST GAS CONVERSION PROCESS AND CATALYST

RELATED APPLICATIONS

This application is a continuation-in-part of Ser. No. 706,684, filed July 19, 1976, now U.S. Pat. No. 4,053,434.

BACKGROUND AND SUMMARY OF THE INVENTION

In the development of catalytic converters for removing hydrocarbons, carbon monoxide, and nitrogen oxides from engine exhaust gases, a common approach has been to provide a two-stage system. In the first stage the raw exhaust gases are passed under net reducing conditions over a suitable catalyst in the absence of added air to effect reduction of nitrogen oxides ($NO_x$). At least a stoichiometric proportion of air is then added to the gases and the resulting mixture is passed through the second stage to effect oxidation of remaining CO and hydrocarbons. Superior catalysts for the $NO_x$ reduction stage comprise rhodium or rhodium-nickel combinations, while palladium and/or platinum are preferred in the oxidation stage.

Although the two-stage system is effective, certain disadvantages have come to be recognized. Firstly, most $NO_x$ reduction catalysts become relatively ineffective under net oxidizing conditions, i.e., when more than stoichiometric amounts of oxygen are present. It has therefore been considered necessary to provide relatively rich air/fuel (A/F) mixtures, with resultant loss in fuel economy. Secondly, air injection for the second stage oxidation reactions tends to oxidize sulfur compounds in the gases to $SO_3$, a more noxious pollutant than $SO_2$. Finally, the provision of air injection and means of control therefor presents a troublesome additional expense. Considerations such as these have led to attempts to develop a single stage "three-way conversion" (TWC) system in which adequate conversion of all three types of pollutants could be obtained in a single converter without secondary air addition, while operating with A/F ratios controlled to vary only moderately from stoichiometric (which is ordinarily about 14.7 lbs. of air per lb. of gasoline). A successful TWC operation should give at least about 70% conversion of $NO_x$, CO, and hydrocarbons over a range of A/F ratios varying by plus or minus 1.0 units from stoichiometric over a relatively short time period.

The present invention is based upon my discovery of a catalyst system which appears to achieve the foregoing objectives to a greater extent than other presently known catalysts. This catalyst comprises at least two separate but contiguously arranged components. The first component comprises a porous inert support upon which is dispersed a minor proportion of nickel and/or cobalt and a much smaller proportion of rhodium. The second component comprises an inert porous support upon which is dispersed a minor proportion of platinum and/or palladium, and preferably nickel and/or cobalt. The most critical aspect of the invention resides in maintaining an essentially complete physical separation between the rhodium component and the platinum and/or palladium component. It has been found that when all the metal components are uniformly distributed on the same support, as by successive impregnations or co-impregnation, the resulting catalyst displays an initially satisfactory TWC performance, but with aging rapidly loses activity for $NO_x$ conversion. This would appear to indicate that deactivation of the rhodium component takes place, and it is speculated that some type of alloying of the rhodium with the platinum and/or palladium may be involved. This would be particularly critical in view of the fact that the proportion of rhodium normally utilized is only about 1/5 to 1/100 of the proportion of platinum and palladium utilized. In any event it has been found that a much more stable TWC operation can be achieved by impregnating the rhodium upon an entirely separate support than the support on which the platinum and/or palladium component is deposited. Several modes of achieving this physical separation of components will be described hereinafter.

PRIOR ART

U.S. Pat. No. 3,886,260 is illustrative of prior art disclosing the superiority of rhodium and rhodium-nickel combinations for $NO_x$ conversion under net reducing conditions. However, it does not disclose a TWC operation, or any platinum or palladium component.

U.S. Pat. No. 3,898,181 discloses a "layered" nickel-rhodium catalyst for $NO_x$ conversion wherein the nickel component is deposited on a non-porous monolith in the absence of alumina, over which an alumina wash coat is deposited, calcined, and subsequently impregnated with rhodium. The nickel component may optionally contain a noble metal such as platinum or palladium. The impregnation with rhodium would obviously penetrate the thin alumina wash coat, resulting in a substantial portion of the rhodium being deposited in intimate contact with any platinum or palladium present. The basic objective of the patent is merely to keep the nickel and alumina components separated, not to keep the rhodium separated from any other metals present. In Example 5, the patent specifically discloses incorporating both rhodium and platinum into the nickel component.

Published French patent application No. 2,218,937 discloses a homogeneously composited catalyst which comprises nickel and rhodium and optionally platinum and/or palladium. The platinum and palladium are disclosed as contributing oxidation activity. There is however no disclosure of a true TWC operation or of maintaining any separation of the catalyst components.

U.S. Pat. No. 3,929,965 discloses a composite catalyst apparently designed to achieve a three-way conversion. The catalyst comprises a co-pelleted mixture of one powdered carrier impregnated with palladium, rhodium and nickel, and another powdered carrier separately impregnated with platinum and palladium. Here again there is no suggestion of maintaining a physical separation between the rhodium and the palladium and/or platinum.

DETAILED DESCRIPTION OF INVENTION

The catalysts of this invention may be prepared in a variety of configurations, all of which will involve inert porous support materials upon which the active metals are deposited. It will be understood that each of the two basic catalyst components may comprise the same or different such porous supports. In general, the porous supports will consist of one or more refractory oxide materials stable at temperatures up to at least about 2000° F, having surface areas between about 5 and 300 $m^2/g$ and pore volumes between about 0.2 and 1.2 ml/g.

Examples of such materials include the various forms of alumina, silica, zirconia, titania, and combinations thereof. Thermally stable compounds such as aluminum phosphate and aluminum borate may also be utilized.

For exhaust gas conversion catalysts, primary requirements for suitable supports are good mechanical strength, low bulk density, thermal and hydrothermal stability, shrink resistance, and chemical inertness. An ideal combination of these qualities has recently been found to inhere in a new class of crystalline aluminum borates described in my U.S. Pat. No. 3,856,705. These preferred aluminum borates are prepared by calcining an intimate admixture of alumina with boria, or a boria precursor such as boric acid or ammonium biborate at temperatures between about 1250° and 2600° F, preferably about 1450°-2300° F. The proportion of boron compound employed should be adjusted to provide a finished catalyst support wherein the weight ratio of $B_2O_3/Al_2O_3$ is between about 5/95 and 35/65, preferably between about 8/92 and 25/75. The overall severity of the calcination step should be controlled so as to produce a substantial, X-ray detectable phase of crystalline $9Al_2O_3 \cdot 2B_2O_3$. Usually a relative minor phase believed to be $2Al_2O_3 \cdot B_2O_3$ is also present.

The size of the aluminum borate crystallites produced in the calcination is the primary parameter governing critical functional aspects of the support such as mechanical and thermal stability, porosity, and surface area. Calcination temperatures in the high ranges tend to produce large crystallites with resultant reduction in surface area and increase in average pore size. Conversely, the lower temperatures tend to give smaller crystallites, higher surface areas and smaller pores. For purposes of this invention, it is desirable to control the calcining so as to give a support having a surface area between about 5-100, preferably about 20-80 $m^2/g$, with a porosity of about 0.4-1.2, preferably about 0.5-1.0 ml/g.

The aluminum borate supports can be prepared in powdered form by admixing powdered alumina with the powdered boria precursor, calcining the mixture and then grinding or ball milling the product. Alternatively, the alumina and the boria precursor may be intimately admixed and formed into extrudates or other desired consolidated forms, and then calcined to form the crystalline aluminum borate. If a honeycomb monolith type catalyst is desired, the channels of a monolith may be coated with a slurry of preformed aluminum borate, or a slurry of alumina and boria precursor, and then dried and calcined.

PHYSICAL FORM OF CATALYSTS

The catalyst systems of this invention comprise at least two separate but contiguous components, A and B. Component A, which contributes most of the $NO_x$ conversion activity, comprises a porous inert support as above described having dispersed thereon a minor proportion of nickel and/or cobalt and a still smaller proportion of rhodium, and is essentially free of platinum and palladium. Component B, which contributes most of the CO and hydrocarbon oxidation activity, comprises a separate porous inert support having dispersed thereon a minor proportion of platinum and/or palladium, and optionally a minor proportion of nickel and/or cobalt, and is essentially free of rhodium. If component B contains nickel and/or cobalt, an optional component, C, which can contribute additional oxidation activity, comprises a porous inert support having dispersed thereon a minor proportion of platinum and/or palladium, and is essentially free of nickel, cobalt, and rhodium.

The separate but contiguous configuration of the foregoing components can be achieved in several different ways. Firstly, separate consolidated granules of each component can be prepared by conventional means, having average diameters between about 1/32 and ¼ inch. Such forms include extrudates, pellets, castings and the like. Preferably, the inert porous support is first formed into the desired shape, calcined and then impregnated with aqueous solutions of the desired metals, followed by drying and calcining. For components A and B it is preferred to first impregnate the granules with the desired base metal or metals (cobalt and/or nickel) and then impregnate with the respective noble metal components, followed by a final calcining. Calcining is carried out at conventional temperatures ranging between about 500° and 2000° F. The components prepared in such granular forms may be utilized as homogeneous or heterogeneous composites. In the homogeneous composites, all components are more or less homogeneously distributed throughout the exhaust gas converter. In the heterogeneous composites, the various components may be segregated into different longitudinal zones or sections of the converter. In this configuration it is normally preferred that component A be placed upstreamwardly from component B, and component C downstreamwardly from component B.

In a second basic configuration, the various components may be utilized in the form of more or less homogeneously admixed and consolidated powders. To prepare these mixtures, separate portions of the desired support material, preferably in precalcined form having a particle size range between about 10 and 100 microns, are separately impregnated with the metals as above described, and are then separately calcined to fix the respective metals within their respective powdered supports. The powdered components are then more or less homogeneously admixed and formed into the desired granular shape, as by pelleting or extruding. It is estimated that composites of this nature will have less than about 10% of the total rhodium content in intimate contact with any other noble metal component.

A variation of the foregoing mixed powder technique involves preparing a mixture of the desired powdered components as described, then forming a suitable slurry or "slip" therefrom with added water or other liquid carrier, and applying the resulting slurry to the channels of a desired monolith structure of the honeycomb-type. The coated monolith is then drained, dried and calcined at temperatures of, e.g., 500°-2000° F. Coated monoliths of this nature, as well as those subsequently described herein, normally comprise about 200-400 channels per cross-sectional square inch, and when coated will comprise about 5-25 weight-percent of the porous inert support material. Several monolith substrates are commercially available, notably those extruded forms composed of cordierite or spodumene with flow channels of different cross-sectional geometry, e.g., square, circular, triangular, sinusoidal, etc., to provide a multiplicty of parallel channels from about 1/32inch to ¼inch in diameter traversing the structure.

Another and preferred type of monolith composite is prepared by first applying a wash coat of the desired porous support material on the monolith substrate, calcining and then impregnating separate zones of the monolith with the desired metals to thereby form separate but contiguous components. It is normally desirable to impregnate the entire wash coated monolith substantially homogeneously with the desired nickel and/or cobalt component. After calcining, one end of the monolith is immersed in a rhodium salt solution, and then dried to form component A in one longitudinal section of the monolith. The other end of the monolith is then immersed in a suitable solution of the desired platinum and/or palladium salts, and the entire monolith is then dried and calcined. In this manner, there is very little overlapping in the monolith of component A with component B. This type of monolith is normally utilized for exhaust gas conversion with component A upstream from component B.

A variation of the foregoing type of impregnated two-zone monolith, simply involves impregnating separate pieces of wash-coated monolith with the respective metals, thus forming separate A and B components which are then coaxially aligned in tandem in the converter, preferably with component A upstream.

In all of the foregoing formulations, it is preferred that the nickel and/or cobalt components be composited with the porous support, as by impregnation, comulling or the like, prior to impregnation of the respective noble metals. Any desired soluble salts of the various metals may be utilized for impregnation, preferably the nitrates, chlorides, acetates, formates, and the like. The active metal contents of the respective individual finished catalyst components, whether in granular or monolith form, fall within the following ranges:

| | Component Compositions, Wt.% | |
|---|---|---|
| | Broad Range | Preferred Range |
| Component A | | |
| Rh | 0.001 − 0.1 | 0.005 − 0.05 |
| NiO and/or Co$_3$O$_4$ | 1 − 20 | 2 − 15 |
| Component B | | |
| Pt and/or Pd | 0.01 − 1.0 | 0.05 − 0.5 |
| NiO and/or Co$_3$O$_4$ | 0 − 20 | 2 − 15 |
| Component C | | |
| Pt and/or Pd | 0.01 − 1.0 | 0.05 − 0.5 |

As noted above, the monolith catalysts normally comprise only about 5–25 weight-percent of the porous support on which the active metals are deposited. Since the foregoing weight-percentages refer to the entire component structure, including the monolith substrate, it will be understood that the metal content of the porous wash coat support itself will be several times greater than the foregoing figures. Suitable proportions of the respective component are as follows:

| | Composite Compositions, Wt.% | |
|---|---|---|
| | Broad Range | Preferred Range |
| Component A | 20 − 80 | 30 − 60 |
| Component B | 20 − 80 | 40 − 70 |
| Component C | 0 − 50 | 20 − 40 |

In the case of monolith composites, the foregoing percentages include a proportion of the monolith substrate which is proportional to the relative amount of porous support material employed in each of the components.

EXAMPLE 1

Two comparison catalysts were prepared as follows:
Catalyst A: A cordierite monolith (W. R. Grace Poramic-49) having 300 cells/in$^2$ was coated with about 20 weight-percent of an aluminum borate wash coat. On a dry basis the wash coat contained about 20 weight-percent B$_2$O$_3$. The entire coated monolith was then impregnated with a nickel nitrate solution, dried and calcined in air at 1500° F. One longitudinal half of the coated monolith was then impregnated with a rhodium chloride solution and dried. The other half of the monolith was then impreganted with a platinum chloride solution, dried and then impregnated with Pd chloride solution. The monolith was then dried and finally calcined at 1000° F.

Catalyst B: Another of the above aluminum borate coated monoliths was impregnated over its entire length with Ni nitrate solution, dried and calcined at 1500° F. The entire monolith was then impregnated with Pt chloride solution and dried. Next it was impregnated with Pd chloride solution, dried, and then impregnated with Rh chloride solution, and finally calcined at 1000° F. The metal contents of the respective catalysts, based on the weight of the entire monoliths, were as follows:

| | Weight Percent | | | |
|---|---|---|---|---|
| Catalyst | NiO | Pd | Pt | Rh |
| A (two zone) | 2.1 | 0.020 | 0.025 | 0.0013 |
| B (single zone) | 2.2 | 0.026 | 0.031 | 0.0011 |

EXAMPLE 2

The foregoing catalysts were tested for three-way conversion activity, catalyst A being placed with the Rh—Ni half upstream. Prior to testing, each catalyst was aged for 64 hours of "redox" cycling at 1400° F, employing a synthetic exhaust gas which was alternately reducing (1% CO, 0.35% O$_2$ for 4 minutes) and oxidizing (1% CO and 4.5% O$_2$ for one minute).

The aged catalysts were then tested for three-way conversion activity at 26,500 GHSV and 1000° F, using a synthetic exhaust gas containing:

| | ppm |
|---|---|
| SO$_2$ | 20 |
| NO | 3000 |
| CH$_4$ | 96 |
| C$_2$H$_2$ | 39 |
| C$_2$H$_4$ | 124 |
| C$_3$H$_6$ | 47 |
| C$_3$H$_8$ | 54 |
| C$_4$H$_8$ | 39 |
| | vol. % |
| CO$_2$ | 13.5 |
| CO | 1 |
| H$_2$O | 10 |
| H$_2$ | 0.33 |
| O$_2$ | 0.35 → 0.94 (variable) |
| N$_2$ | balance |

Each catalyst was tested with feed gases of several different O$_2$ contents. The resulting percent conversions of NO, CO and hydrocarbons (HC) were plotted against the "equivalence ratio" (E.R.) of the respective feed gas. The equivalence ratio is a measure of the amount of oxygen (including that in the NO) present in the feed gas, relative to the stoichiometric amount required to completely oxidize the CO, H$_2$ and HC's to CO$_2$ and H$_2$O, and can be expressed as follows:

$$E.R. = \frac{0.5 \, (NO) + (O_2)}{0.5(CO) + 0.5 \, (H_2) + x(HC)},$$

where $x$ is the average number of carbon atoms, plus 0.25 times the average number of hydrogen atoms, per HC molecule. A stoichiometric exhaust gas has an E.R. of 1.0.

The purpose of testing at various E.R. values was to obtain some estimate as to whether satisfactory conversion of $NO_x$, CO and HC's could be maintained under vehicle operating conditions, with A/F ratios varying slightly from stoichiometric. Previous correlations have indicated that if the present test conditions can maintain at least about 60% conversion of each component within an E.R. "window" of 0.2 units falling within the E.R. range of 0.8 - 1.2, satisfactory performance will result under vehicle operation conditions controlled over a range of A/F ratios near stoichiometric.

Data from the various runs were plotted, and representive points picked from the curves are as follows:

Table 1

| Exhaust Gas | Catalyst A | | | Catalyst B | | |
|---|---|---|---|---|---|---|
| Equivalence Ratio | $NO_x$ | CO | HC | $NO_x$ | CO | HC |
| 0.9 | 85 | 71 | 72 | 60 | 58 | 73 |
| 1.0 | 83 | 86 | 78 | 57 | 70 | 76 |
| 1.1 | 70 | 95 | 79 | 41 | 89 | 89 |

T = 1000° F, Percent Conversion

Clearly, catalyst A is substantially more effective for $NO_x$ and CO conversion than is catalyst B, even though both catalysts contained substantially the same overall metal loadings.

EXAMPLE 3

During the foregoing runs, the selectivity of conversion of NO to $N_2$ was also determined for each catalyst, both in their fresh and aged state. (It is important that the $NO_x$ be converted to $N_2$ in preference to $NH_3$, for the latter can be reoxidized to $NO_x$). The results were as follows:

Table 2

Nitrogen Selectivity, T = 1000° F at Equivalence Ratio = 1.01

| Catalyst | % $NO_x$ Conversion | % $N_2$ Selectivity | % $NO_x$ Efficiency |
|---|---|---|---|
| A (Fresh) | 98 | 100 | 98 |
| B (Fresh) | 94 | 85 | 80 |
| A (Aged) | 83 | 99 | 82 |
| B (Aged) | 57 | 87 | 50 |

It is apparent that aging drastically reduced the $NO_x$ conversion activity and efficiency of catalyst B.

EXAMPLE 4

Another two-zone monolith catalyst composite, C, was prepared in a manner analagous to that of catalyst A, except that separate pieces of aluminum borate coated monolith, each ½ the length of catalyst A, were separately impegnated, one with Ni—Rh and the other with Ni—Pt. The Ni—Rh segment contained 4.5% NiO and 0.035% Rh, while the Ni—Pt segment contained 8% NiO and 0.22% Pt. This composite catalyst was then tested as described in Examples 2 and 3, first with the Ni—Rh segment upstream, and then with the segments reversed. The results were as follows:

Table 3

| Exhuast Gas | Catalyst C | | | Catalyst C-Reversed | | |
|---|---|---|---|---|---|---|
| Equivalence Ratio | $NO_x$ | CO | HC | $NO_x$ | CO | HC |
| 0.9 | N.D. | 74 | 48 | N.D. | 86 | 57 |
| 1.0 | 99 | 100 | 65 | 99 | 98 | 62 |
| 1.1 | 74 | N.D. | 82 | 71 | N.D. | 79 |

T = 1000° F, Percent Conversion

Table 4

Nitrogen Selectivity, T = 1000° F at Equivalence Ratio = 1.01

| Catalyst | % $NO_x$ Conversion | % $N_2$ Selectivity | % $NO_x$ Efficiency |
|---|---|---|---|
| C | 99 | 98 | 97 |
| C-Reversed | 98 | 94 | 92 |

From the foregoing, it would appear that somewhat better conversion of CO and hydrocarbons is obtained under rich A/F conditions when the Ni—Pt zone is upstream.

EXAMPLE 5

Another catalyst composite was prepared as described in Example 4, except that the Pt-containing segment was first impregnated with cobalt instead of nickel. The latter segment analyzed 9.2% $Co_3O_4$ and 0.19% Pt. Upon testing the composite as in Example 4, the following results were obtained:

Table 5

| Exhaust Gas | Catalyst D | | | Catalyst D-Reversed | | |
|---|---|---|---|---|---|---|
| Equivalence Ratio | $NO_x$ | CO | HC | $NO_x$ | CO | HC |
| 0.9 | N.D. | 76 | 59 | N.D. | 85 | 55 |
| 1.0 | 97 | 96 | 74 | 93 | 97 | 60 |
| 1.1 | 80 | N.D. | 84 | 65 | N.D. | 78 |

T = 1000° F, Percent Conversion

Table 6

Nitrogen Selectivity, T = 1000° F at Equivalence Ratio = 1.01

| Catalyst | % $NO_x$ Conversion | % $N_2$ Selectivity | % $NO_x$ Efficiency |
|---|---|---|---|
| D | 97 | 87 | 84 |
| D-Reversed | 92 | 98 | 90 |

The foregoing appears to indicate that somewhat inferior $NO_x$ conversion results when the Co—Pt component is placed upstream from the Ni—Rh component. However, better selectivity is obtained.

EXAMPLE 6

A borate-stabilized alumina support was prepared by impregnating ⅛ inch alumina extrudates with an aqueous solution of ammonium biborate, drying and calcining at 1800° F for 4 hours. The resulting support contained 7.4 wt.% $B_2O_3$, had a bulk density of 0.67 g/ml, and a pore volume of 0.64 ml/g.

Catalyst component A was prepared by impregnating a portion of the support first with nickel nitrate solution to give 14.4 wt.% NiO, then with rhodium chloride solution to give 0.02 wt.% Rh after calcination.

Component B was prepared by impregnating another portion of the support with cobalt nitrate solution to give 14.6 wt.% $Co_3O_4$, then with platinous chloride solution to give 0.19 wt.% Pt after calcination.

Component C was prepared by impregnating another portion of the support with palladium chloride solution to give 0.2 wt.% Pd after calcination.

Composite catalyst E was prepared by homogeneously commingling 52.7 wt.% of component A, 27.1% of component B and 20.2% of component C.

EXAMPLE 7

A crystalline aluminum borate support was prepared by impregnating ⅛ inch alumina extrudates with an aqueous solution of ammonium biborate, drying and calcining at 1800° F for 4 hours. The resulting support contained 20.6 wt.% $B_2O_3$, had a bulk density of 0.77 g/ml and a pore volume of 0.46 ml/g.

Three portions of this support were separately impregnated with appropriate salt solutions as described in Example 6 to give the following catalyst components:

| Component | Metal, wt.% |
|---|---|
| A | 12.3 NiO + 0.009 Rh |
| B | 12.3 NiO + 0.062 Pt |
| C | 0.059 Pd + 0.073 Pt |

Catalyst composite F was prepared by homogeneously commingling 34.8 wt.% of component A, 34.9% of component B and 30.3% of component C.

EXAMPLE 8

Catalyst composites E and F were then activity tested at 40,000 GHSV and 900° F using a synthetic exhaust gas containing:

|  | ppm |
|---|---|
| $C_3H_6$ | 168 |
| $C_3H_8$ | 56 |
| NO | 1000 |
|  | vol.% |
| CO | 1.0 |
| $H_2$ | 0.34 |
| $CO_2$ | 12.0 |
| $H_2O$ | 13.0 |
| $O_2$ | 0.47→1 |
| $N_2$ | balance |

The results were as follows:

Table 7

| Exhaust Gas Equivalence Ratio | Percent Conversion, T = 900° F | | | | | |
|---|---|---|---|---|---|---|
| | Catalyst E | | | Catalyst F | | |
| | $NO_x$ | CO | HC | $NO_x$ | CO | HC |
| 0.9 | 90 | 86 | 90 | 82 | 85 | 88 |
| 1.0 | 75 | 90 | 89 | 73 | 93 | 86 |
| 1.05 | 60 | 92 | 84 | 55 | 94 | 82 |

The catalyst systems of this invention are found to give satisfactory TWC performance over the entire range of normal engine operating conditions, with catalytic units designed to treat the exhaust gases at space velocities ranging between about 10,000 and 500,000 GHSV, and at temperatures ranging between about 800° and 2500° F.

The following claims and their obvious equivalents are believed to define the true scope of the invention.

I claim:

1. A method for the conversion of nitrogen oxides, carbon monoxide and hydrocarbons in near stoichiometric engine exhaust gases which comprises passing said exhaust gases under conversion conditions through a two-catalyst system to which no air is admitted downstream from the inlet thereto, said system comprising two contiguous catalytic components, A and B, segregated in separate longitudinal zones of said system, component A comprising a porous, inert support having dispersed thereon 1–20 weight % of nickel and/or cobalt and a smaller proportion of rhodium, and being essentially free of platinum and palladium, component B comprising a porous inert support having dispersed thereon a minor proportion of platinum and/or palladium and being essentially free of rhodium.

2. A method as defined in claim 1 wherein said exhaust gases are contacted first with component A and then with component B.

3. A method as defined in claim 1 wherein said exhaust gases are contacted first with component B and then with component A.

4. A method as defined in claim 1 wherein said components A and B are applied as a coating to separate ceramic monoliths having a honeycomb structure, said monoliths being co-axially aligned with each other.

5. A method as defined in claim 1 wherein said component A is applied as a coating to one longitudinal zone of a ceramic monolith having a honeycomb structure, and said component B is applied as a coating to a separate longitudinal zone thereof.

6. A method as defined in claim 5 wherein said component A is distributed over a zone A' extending from one end of said monolith a distance between about 1/5 and 4/5 of the length thereof, and component B is distributed over a zone B' extending from the opposite end of said monolith to the beginning of zone A'.

7. A method as defined in claim 1 wherein said components A and B are in the form separately consolidated granules having an average diameter between about 1/32 and ¼ inch, said separately consolidated granules being segregated from each other at opposite ends of said system.

8. A method as defined in claim 1 wherein the weight-percent of rhodium in said two-catalyst system is about 1/5 to 1/100 the weight-percent of total platinum and palladium therein.

9. A method as defined in claim 1 wherein said component B also comprises a minor proportion of cobalt and/or nickel dispersed on said porous support.

10. An exhaust gas conversion catalyst comprising a ceramic monolith having a honeycomb structure, the interior channels of one end of said monolith being coated with a catalyst component A, and the interior channels of the opposite end of said monolith being coated with a separate catalyst component B, and wherein component A comprises a porous inert support having dispersed thereon 1–20 weight % of nickel and/or cobalt and a smaller proportion of rhodium, and being essentially free of platinum and palladium, and component B comprises a porous inert support having dispersed thereon a minor proportion of platinum and/or palladium and being essentially free of rhodium.

11. A catalyst as defined in claim 10 wherein said component A is distributed over a zone A' extending from one end of said monolith a distance between about 1/5 and 4/5 of the length thereof, and component B is distributed over a zone B' extending from the opposite end of said monolith to the beginning of zone A'.

12. A catalyst as defined in claim 11 wherein the weight-percent of rhodium therein is about 1/5 to 1/100 the weight-percent of total platinum and palladium therein.

13. A catalyst as defined in claim 10 wherein said component B also comprises a minor proportion of nickel and/or cobalt dispersed on said porous support.

14. A catalyst as defined in claim 13 which also comprises a third separate but contiguous component, C, comprising an inert, porous support having dispersed thereon a minor proportion of platinum and/or palladium, and being essentially free of nickel, cobalt and rhodium.

* * * * *